United States Patent
Zhang et al.

(10) Patent No.: US 12,000,067 B2
(45) Date of Patent: Jun. 4, 2024

(54) INTELLIGENT YARN LOADING SYSTEM AND CONTROL METHOD

(71) Applicant: YICHANG JINGWEI TEXTILE MACHINERY CO., LTD., Hubei (CN)

(72) Inventors: Ming Zhang, Hubei (CN); Pihua Zhang, Hubei (CN); Ming Xiao, Hubei (CN); Hongyong Fan, Hubei (CN); Haibo Jiang, Hubei (CN); Huanian Yang, Hubei (CN)

(73) Assignee: YICHANG JINGWEI TEXTILE MACHINERY CO., LTD. (CN)

( * ) Notice: Subject to any disclaimer, the term of this patent is extended or adjusted under 35 U.S.C. 154(b) by 824 days.

(21) Appl. No.: 17/017,489

(22) Filed: Sep. 10, 2020

(65) Prior Publication Data
US 2021/0404094 A1 Dec. 30, 2021

(30) Foreign Application Priority Data
Jun. 30, 2020 (CN) .............................. 202010610284

(51) Int. Cl.
*D01H 9/10* (2006.01)
*D01H 9/00* (2006.01)

(52) U.S. Cl.
CPC ............... *D01H 9/10* (2013.01); *D01H 9/001* (2013.01)

(58) Field of Classification Search
CPC ........................... D01H 9/00–187; D01H 1/18
See application file for complete search history.

(56) References Cited

U.S. PATENT DOCUMENTS

| | | | | | |
|---|---|---|---|---|---|
| 3,247,661 | A | * | 4/1966 | King, Jr. ................... | D01H 9/10 57/272 |
| 3,566,597 | A | * | 3/1971 | Foglio Para ............. | D01H 9/10 57/271 |
| 3,844,099 | A | * | 10/1974 | Tsuchiyama ............. | D01H 9/10 57/269 |
| 4,079,898 | A | * | 3/1978 | Murakami ............. | B65H 67/04 242/473.7 |
| 4,165,585 | A | * | 8/1979 | Ishida ....................... | D01H 9/10 57/274 |
| 4,473,997 | A | * | 10/1984 | Kawasaki ............... | D01H 9/005 57/90 |
| 4,515,328 | A | * | 5/1985 | Payne, Jr. ................. | D02H 1/00 414/331.03 |

(Continued)

FOREIGN PATENT DOCUMENTS

| CN | 109809250 | * | 5/2019 | .............. | B25J 13/08 |
|---|---|---|---|---|---|
| CN | 110485006 | * | 11/2019 | .............. | B25J 11/00 |

*Primary Examiner* — Khoa D Huynh
*Assistant Examiner* — Uyen T Nguyen (57) ABSTRACT

An intelligent yarn loading system and a control method are provided. The intelligent yarn loading system comprises a twisting machine, a self-walking trolley and a dispatching control system; the twisting machine is provided with a twisting machine wireless communication module for sending a working state of the twisting machine to the dispatching control system; the self-walking trolley is provided with a trolley wireless controller and a self-walking device for receiving an instruction of the dispatching control system and walking to a station of the twisting machine to take off an empty bobbin, and put a basic yarn on a creel of the twisting machine or take off a finished product package for stacking.

4 Claims, 9 Drawing Sheets

(56) References Cited

U.S. PATENT DOCUMENTS

| | | | | |
|---|---|---|---|---|
| 4,591,106 A * | 5/1986 | Gay | B65H 67/0411 | 57/274 |
| 4,757,679 A * | 7/1988 | Marzoli | D01H 9/046 | 57/274 |
| 4,817,373 A * | 4/1989 | Gualchierani | D01H 9/005 | 57/276 |
| 4,928,476 A * | 5/1990 | Otoshima | D01H 9/10 | 242/473.6 |
| 4,938,017 A * | 7/1990 | Stadele | D01H 1/38 | 57/274 |
| 4,988,252 A * | 1/1991 | Yamamoto | B65H 67/065 | 414/346 |
| 5,096,357 A * | 3/1992 | Galbani | B65H 67/06 | 414/331.11 |
| 5,109,662 A * | 5/1992 | Inger | B65H 73/00 | 57/305 |
| 5,119,621 A * | 6/1992 | Inger | B65H 54/26 | 57/271 |
| 5,136,833 A * | 8/1992 | Inger | D01H 9/16 | 242/476.1 |
| 5,168,697 A * | 12/1992 | Brockmanns | D01H 9/00 | 57/313 |
| 5,189,872 A * | 3/1993 | Mima | B65H 67/0405 | 57/58.49 |
| 5,218,748 A * | 6/1993 | Tanaka | B65H 67/06 | 414/908 |
| 5,224,660 A * | 7/1993 | Stahlecker | D01H 9/10 | 242/473.6 |
| 5,272,865 A * | 12/1993 | Sasaki | D01H 9/005 | 57/90 |
| 5,349,807 A * | 9/1994 | Kawarabashi | D01H 15/007 | 57/261 |
| 5,391,045 A * | 2/1995 | Raasch | D01H 9/185 | 414/626 |
| 5,526,634 A * | 6/1996 | Mima | D01H 15/007 | 57/279 |
| 5,582,354 A * | 12/1996 | Peters | B65H 67/068 | 242/473.6 |
| 6,138,937 A * | 10/2000 | Straaten | B65H 67/0411 | 198/572 |
| 6,272,832 B1 * | 8/2001 | Gobbels | D01H 9/10 | 57/263 |
| 8,931,725 B2 * | 1/2015 | Grimshaw | B29C 31/00 | 242/131 |
| 2018/0011491 A1 * | 1/2018 | Morton | G05B 19/41895 | |
| 2019/0044220 A1 * | 2/2019 | Kozakai | H04B 1/0458 | |
| 2020/0306905 A1 * | 10/2020 | Sloupensky | D01H 9/185 | |

* cited by examiner

INTELLIGENT YARN LOADING SYSTEM AND CONTROL METHOD

FIELD

The present invention relates to the field of twisting machines, and more particularly, to an intelligent yarn loading system and a control method.

BACKGROUND

Basic yarn packages of twisting machines of an industrial filament, a glass fiber and a BCF carpet yarn are generally more than 10 KG, and a station in a twisting workshop above a scale has more than 10,000 spindles. Basic yarn carrying and replacement and finished product stacking take a long time and have a low efficiency and a high labor intensity in production and operation, so that there is an urgent demand for machines to take place of humans.

The prior art discloses a movable creel walking above the twisting machine. After the basic yarn is completely consumed, all the creels move out along a track in sequence, walk to a fixed position outside the twisting machine for automatic yarn loading, and then walk along an annular track for resetting after loading. The method has a defect that nearly 100 spindles of basic yarns on one side of the twisting machine must be used up before moving and replacing, so that an efficiency, a flexibility and a dexterity are extremely low.

Another currently used automatic yarn loading device is also operated above the twisting machine, and a large number of supporting frames and linear modules are installed on a top portion of the machine and the ground. A manipulator slides along the linear modules, grabs the basic yarns one by one from a hopper area on the top portion of the machine, and sends the basic yarns to a storage point on a top portion of a spindle position. In this way, the basic yarns still need to be manually carried from the storage point to the station, thus having a low automation degree, and the workshop, the machine and the creel need to be greatly reformed, thus having a long cycle and a high cost.

An intelligent filament loading system of a twisting machine robot in the patent CN110485006A uses a robot to walk on the ground to load the yarn, and uses navigation and vision technologies to position, which may meet automatic yarn loading of a small number of twisting machines with a low cost. In addition, the patent document CN109355745A discloses a clamping device and method for two-for-one twisting machine winding bobbin, the robot takes off a twisting and coiling package and then places the twisting and coiling package on a creel trolley, and the creel trolley needs to be moved manually. The prior art has the shortcomings that the robot and the twisting machine have no data interaction, and there is no overall dispatching and control system; and the yarn loading must be performed after doffing and stopping of the twisting machine, and the yarn loading can only be performed on a station at an outer side of the creel, thus having a low intelligent degree and a low automation degree.

SUMMARY

The technical problem to be solved by the present invention lies in providing an intelligent yarn loading system and a control method, which can realize an intelligent yarn loading operation, greatly improve an operating efficiency, reduce a labor intensity and reduce manual operations.

In order to solve the above technical problem, the technical solution used by the present invention is: an intelligent yarn loading system, which comprises a twisting machine, a self-walking trolley and a dispatching control system, wherein:
 the twisting machine is provided with a twisting machine wireless communication module for sending a working state of the twisting machine to the dispatching control system;
 the self-walking trolley is provided with a trolley wireless controller and a self-walking device for receiving an instruction of the dispatching control system and walking to a station of the twisting machine to take off an empty bobbin, and put a basic yarn on a creel of the twisting machine or take off a finished product package for stacking, and the self-walking device is able to automatically walk to a designated position according to feedback of a navigation device; and
 the dispatching control system is used for receiving the working state of the twisting machine, and dispatching the self-walking trolley to load or unload a yarn for the twisting machine according to the working state of the twisting machine.

In a preferred solution, the dispatching control system is electrically connected with a switch through a wireless communication module, the switch is electrically connected with a wireless WiFi module, the wireless WiFi module is connected with the self-walking trolley or the twisting machine directly or through a wireless relay to form a communication network among the twisting machine, the self-walking trolley and the dispatching control system.

In a preferred solution, the intelligent yarn loading system further comprises a navigation device, wherein the navigation device is used for enabling the self-walking trolley to accurately judge a position of the self-walking trolley, and eliminating an error of the self-walking device;
 the navigation device is a ground sign, and the self-walking trolley compares a position of the ground sign through a first camera, so as to accurately judge the position of the self-walking trolley; or
 the navigation device is a magnetic strip, and the self-walking trolley detects the magnetic strip through a magnetic sensor, so as to accurately judge the position of the self-walking trolley; or
 the navigation device is a backup plate, and the self-walking trolley approaches the backup plate from two sides, so as to eliminate an accumulated error of the self-walking device.

In a preferred solution, the twisting machine is provided with the rotatable creel, an inside yarn position and an outside yarn position are respectively located at two ends of a yarn position seat, and the yarn position seat is connected with the creel through a rotating shaft and is used for rotating the processed basic yarn from the inside yarn position to the outside yarn position; and
 the rotating shaft is connected with a yarn position driving device to drive the yarn position seat to rotate.

In a preferred solution, a roof of the self-walking trolley is further provided with a manipulator, and a free end of the manipulator is provided with a mechanical claw camera, a first mechanical claw and a second mechanical claw;
 the mechanical claw camera is used for judging a position of the mechanical claw through visual recognition by acquiring an image; and
 the first mechanical claw is used for taking off the bobbin, and the second mechanical claw is used for installing the basic yarn; and the first mechanical claw and the second mechanical claw are a plurality of mechanical fingers capable of changing a circumscribed circle diameter.

In a preferred solution, the self-walking trolley is further provided with a basic yarn stacking position, an empty bobbin storage box and a partition board storage box;

the empty bobbin storage box is located in a middle of the self-walking trolley, a top portion of the empty bobbin storage box is provided with a manipulator seat, and the manipulator is fixedly installed on the manipulator seat; and the basic yarn stacking position is located on two sides of the empty bobbin storage box, and the partition board storage box is located on two sides of the basic yarn stacking position.

In a preferred solution, the dispatching control system comprises task implementation, device management and production management modules;

the task implementation module is responsible for receiving a signal and sending an instruction, monitoring task implementation, making correction and feedback in real time, and dispatching tasks simultaneously implemented by multiple self-walking trolleys; and docking the tasks with front-end material feeding and back-end storage to ensure smooth operation and supply of materials;

the device management module manages charging, an operating state, a device state, fault alarm, safety recognition and a human-vehicle diversion state of the self-walking trolley; and the production management module manages a current shift and a shift output, a total output, an operating beat and an efficiency, and monitors a consumption state of the basic yarn of the machine.

In a preferred solution, the twisting machine is provided with a basic yarn sensor, the basic yarn sensor is located at a position closely tangent to an outer diameter of the bobbin to detect consumption of the basic yarn, when the basic yarn is completely consumed, a signal is sent, which is received and analyzed by the dispatching control system, and then a yarn change request is sent to an operator and the self-walking trolley.

A control method used in the above intelligent yarn loading system comprises the following steps:

S1. sending, by the twisting machine, consumption information of the basic yarn according to a detection signal of the basic yarn sensor; and meanwhile, switching the bobbin on which the basic yarn is used up on the creel to the outside yarn position; and S2. receiving, by the dispatching control system, information sent by the twisting machine, instructing the self-walking trolley after finishing preparation to automatically walk to vicinity of the twisting machine, taking off, by the manipulator, the basic yarn from a yarn stack, and taking off, by the manipulator, the bobbin and installing the basic yarn in situ;

positioning a position of the basic yarn on the yarn stack through visual recognition by an image shot by the mechanical claw camera during operating; and positioning a position of a positioning rod needing yarn loading on the creel through visual recognition by the image shot by the mechanical claw camera; and realizing intelligent yarn loading by the above steps.

In a preferred solution, the dispatching control system counts a number according to the consumption information of the basic yarn sent by the twisting machine, and a certain amount is accumulated, which means that the self-walking trolley is instructed to unload the finished product package at a tail of the twisting machine, and the finished product package is stacked on a nearby pallet;

the dispatching control system instructs the self-walking trolley to charge the self-walking trolley at a charging position according to an electric quantity of the self-walking trolley; and the self-walking trolley counts yarn loading times every time, and when the counted times reach the number of the basic yarns of the basic yarn stacking position, the self-walking trolley automatically goes to a yarn taking area to supplement the basic yarn, and unloads the bobbin and the partition board.

The present invention provides the intelligent yarn loading system and the control method, and compared with a yarn change method that the whole creel walks to the fixed position outside the twisting machine in the prior art, the solution of yarn change by the self-walking trolley has stronger production flexibility and dexterity, a shorter beat, and a higher efficiency; the yarn is changed in real time and online without needing to stop the twisting machine to wait; a broken yarn and a faulty spindle position may be skipped to eliminate waste and redundant operation; and the creel may still be pulled down to operate, so that yarn threading and splicing are convenient, and an original manual yarn change method is compatible. A yarn change method that the manipulator walks in the air is used currently, which requires to erect a large number of supporting frames, guide rails and linear modules, due to disconnection between the guide rails of the twisting machines, the manipulator cannot circularly serve multiple twisting machines, thus having a high cost and a low efficiency. The automatic yarn change system in the present invention does not need workshop construction and device modification, thus having a low cost, a small installation and debugging workload and a short cycle, and is able to freely shuttle through workshop passages to serve multiple twisting machines. Walking, positioning, manipulator grabbing and yarn loading of the self-walking trolley are all completed on the ground, and compared with walking and movement of the creel or the manipulator in the air with the basic yarn, the self-walking trolley has no risk of falling of the basic yarn and parts, and has no safety threat to a pedestrian and an operator on the ground. A technical problem of automatic yarn change of the basic yarn on an inner side of the creel is solved by using a solution of the rotatable creel. The manipulator of the present invention is able to grab the empty bobbin and install the basic yarn by one action, thus greatly improving an operating efficiency. The self-walking trolley of the present invention may stack the basic yarn and the finished product package, thus achieving multiple functions by one machine. The creel of the twisting machine is provided with the basic yarn sensor to monitor the consumption state of the basic yarn in real time and send the signal to the dispatching control system to inform the self-walking trolley, and the self-walking trolley accurately supplies the spindle position lacking the yarn intelligently. The manipulator is provided with the mechanical claw camera, which positions the position of the mechanical claw through image recognition, and is able to detect a quality of the basic yarn and a quality of a finished product through image processing and an algorithm, and the detection by the mechanical claw camera is more reliable and more accurate than detection by human eyes. The present invention is able to comprehensively and systematically manage implementation of a yarn change task and statistics of various parameters of the self-waling trolley and a production efficiency by the dispatching control system, so that an automation degree and an intelligent degree are high, and workshop labors can be reduced by more than half.

BRIEF DESCRIPTION OF THE DRAWINGS

The present invention is further described hereinafter with reference to the accompanying drawings and the embodiments.

In the drawings, 1 refers to basic yarn, 2 refers to twisting machine, 3 refers to creel, 301 refers to inside yarn position, 302 refers to outside yarn position, 303 refers to positioning rod, 304 refers to rotating shaft, 305 refers to yarn position driving device, 306 refers to yarn position seat, 4 refers to bobbin, 5 refers to self-walking trolley, 51 refers to basic yarn stacking position, 6 refers to manipulator, 61 refers to mechanical claw camera, 62 refers to first mechanical claw, 63 refers to second mechanical claw, 7 refers to basic yarn sensor, 8 refers to partition board, 9 refers to empty bobbin storage box, 10 refers to trolley wireless controller, 11 refers to yarn stack, 12 refers to dispatching control system, 13 refers to communication module, 14 refers to switch, 15 refers to wireless WiFi module, 16 refers to wireless relay, 17 refers to twisting machine wireless communication module, 18 refers to standby point, 19 refers to navigation device, 20 refers to yarn taking area, 21 refers to charging position, 22 refers to finished product package, 23 refers to finished product conveyor belt, 24 refers to manipulator seat, 25 refers to pallet, 26 refers to partition board storage box, 52 refers to self-walking device, 53 refers to first camera, 19 refers to ground sign, 27 refers to backup plate (backing plate), 28 refers to magnetic sensor, and 29 refers to magnetic strip.

DETAILED DESCRIPTION

Embodiment 1

As shown in FIG. 1 to FIG. 7, an intelligent yarn loading system comprises a twisting machine 2, a self-walking trolley 5 and a dispatching control system 12.

Figure 1:
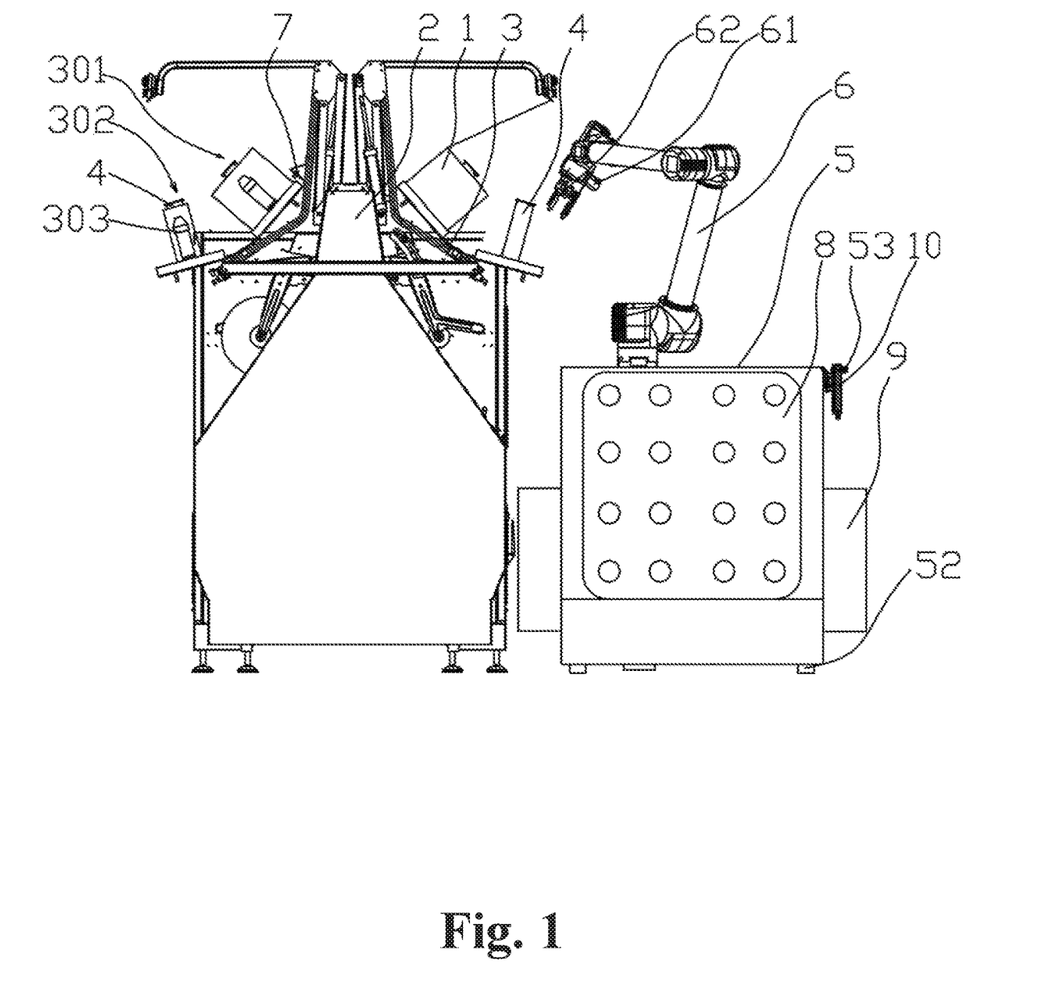
FIG. 1 is a structure diagram of yarn loading according to the present invention.

The twisting machine 2 is provided with a twisting machine wireless communication module 17 for sending a working state of the twisting machine 2 to the dispatching control system 12. A wireless serial server is preferably used as the twisting machine wireless communication module 17 in the embodiment.

The self-walking trolley 5 is provided with a trolley wireless controller 10 and a self-walking device 52, and further provided with a manipulator 6 for receiving an instruction of the dispatching control system 12 and walking to a station of the twisting machine 2 to take off an empty bobbin 4, and put a basic yarn 1 on a creel 3 of the twisting machine 2 or take off a finished product package 22 for stacking. The self-walking device is able to automatically walk to a designated position according to feedback of a navigation device. The self-walking device in the self-walking trolley 5 is the prior art, for example, the Chinese patent document CN108891503A records a space-saving AGV trolley, the CN210191680U records an explosion-proof load-bearing built-in loading type AGV, etc. The self-walking device is able to walk along a preset path according to instructions, and is able to automatically adjust a positioning accuracy according to a navigation device.

The navigation device of this application can be realized by a first camera 53 and a ground sign 19, or a magnetic sensor 28 and a magnetic strip 29, or backup plate (backing plate) 27.

The dispatching control system 12 is used for receiving a working state of the twisting machine 2, and dispatching the self-walking trolley 5 to load or unload a yarn for the twisting machine 2 according to the working state of the twisting machine 2.

Figure 2:
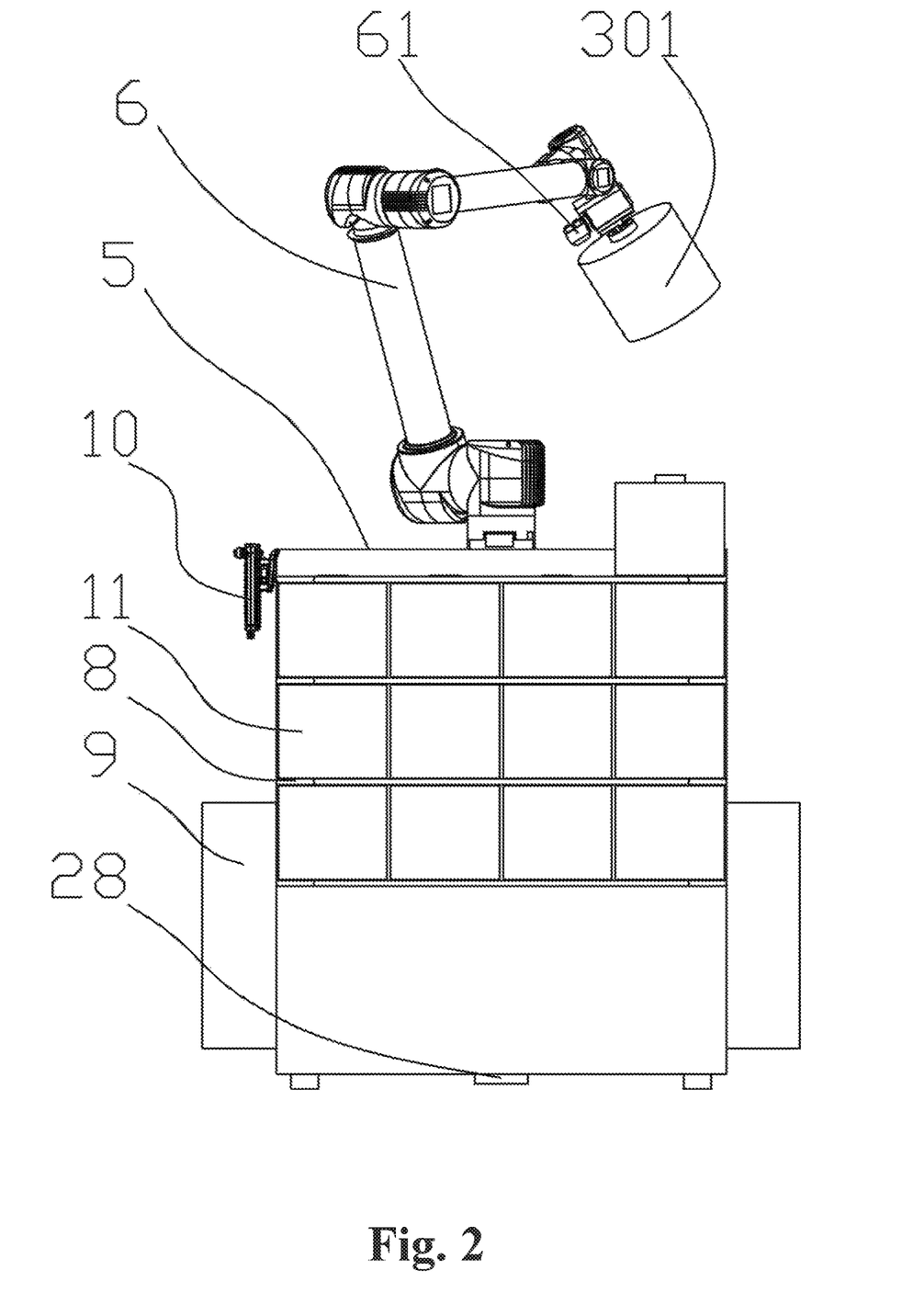
FIG. 2 is a structure diagram of a self-waling trolley according to the present invention.
Figure 3:
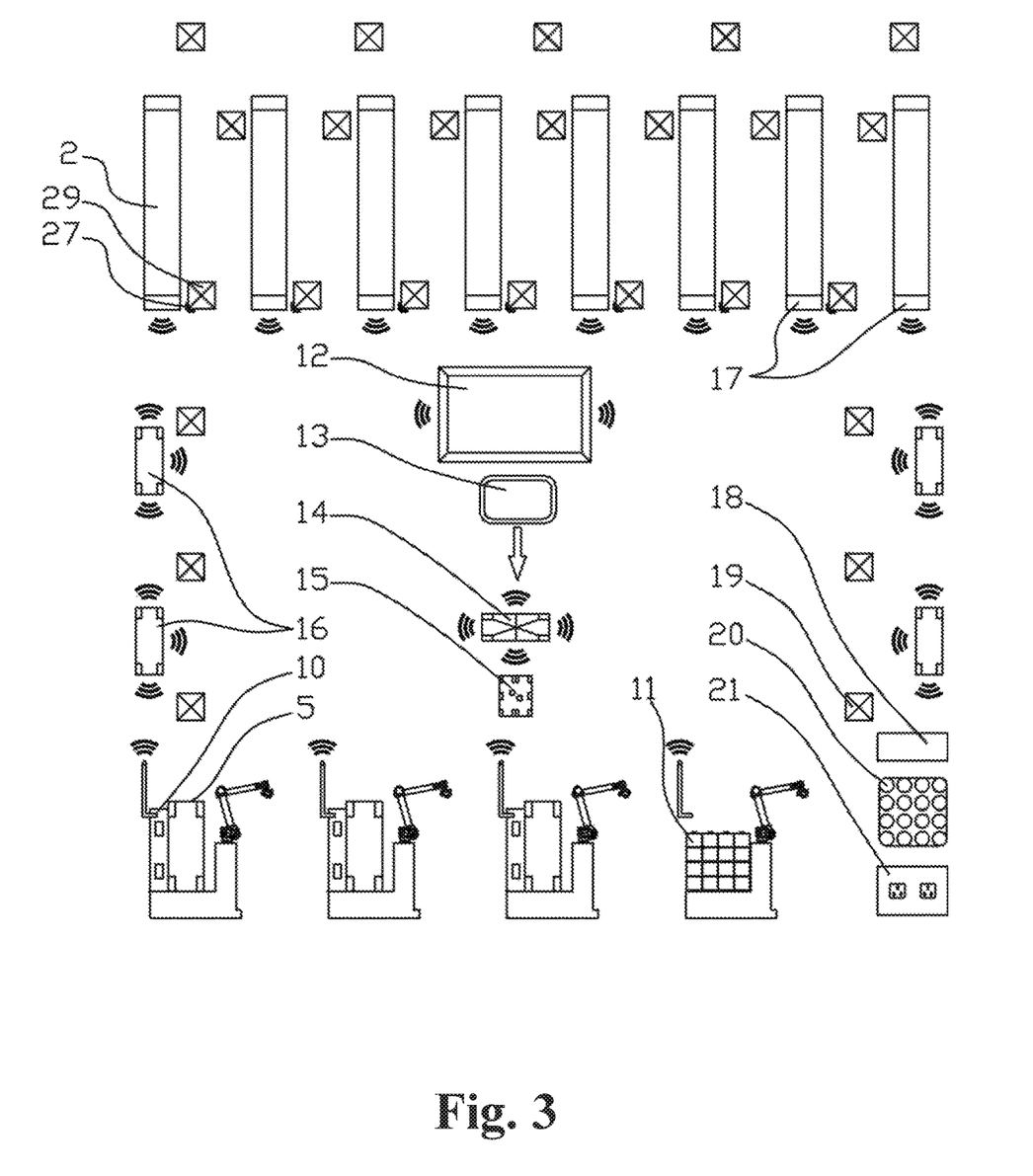
FIG. 3 is an overall structure diagram of a control system according to the present invention.
Figure 4:
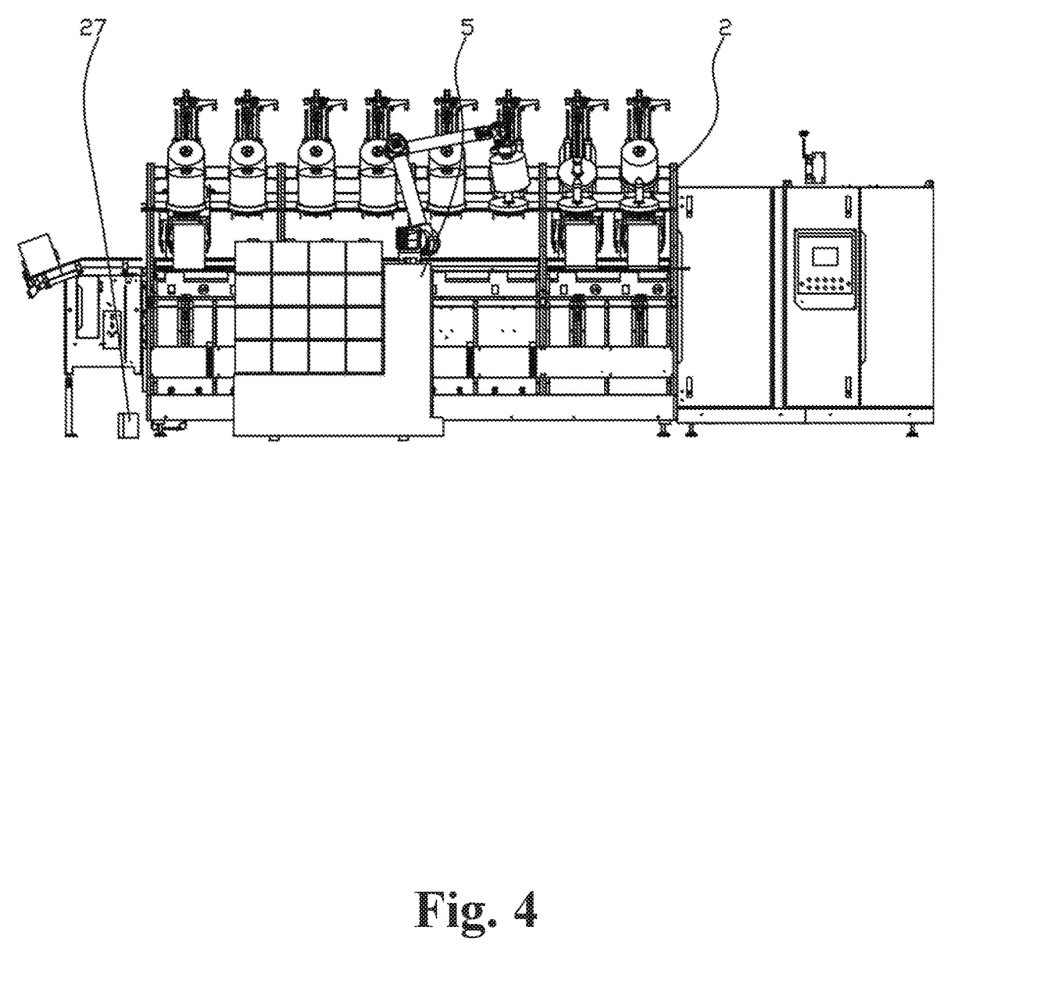
FIG. 4 is a front view of a twisting machine according to the present invention.

A preferred solution is shown in FIG. 2, the dispatching control system 12 is electrically connected with a switch 14 through a wireless communication module 13, the switch 14 is electrically connected with a wireless WiFi module 15, and the wireless WiFi module 15 is electrically connected with the self-walking trolley 5 or the twisting machine 2 directly or through a wireless relay 16 to cover all twisting machines 2 and self-walking trolleys 5, thus form a communication network among the twisting machine 2, the self-walking trolley 5 and the dispatching control system 12. An industrial personal computer is preferably used as the dispatching control system 12.

A preferred solution is shown in FIG. 2, the intelligent yarn loading system further comprises a navigation device, wherein the navigation device is used for enabling the self-walking trolley 5 to accurately judge a position of the self-walking trolley, and eliminating an error of the self-walking device.

Optionally, the navigation device is a ground sign, such as a QR code, and the self-walking trolley 5 compares a position and an orientation of the ground sign through a first camera 53, so as to accurately judge the position and the orientation of the self-walking trolley, thus correcting an accumulated walking error.

Optionally, the navigation device is a magnetic strip 29, and the self-walking trolley 5 detects the magnetic strip through a magnetic sensor 28, so as to accurately judge the position of the self-walking trolley.

Optionally, the navigation device is a backup plate 27, and the self-walking trolley 5 approaches the backup plate 27 from two sides, so as to eliminate an accumulated error of the self-walking device.

Figure 8:
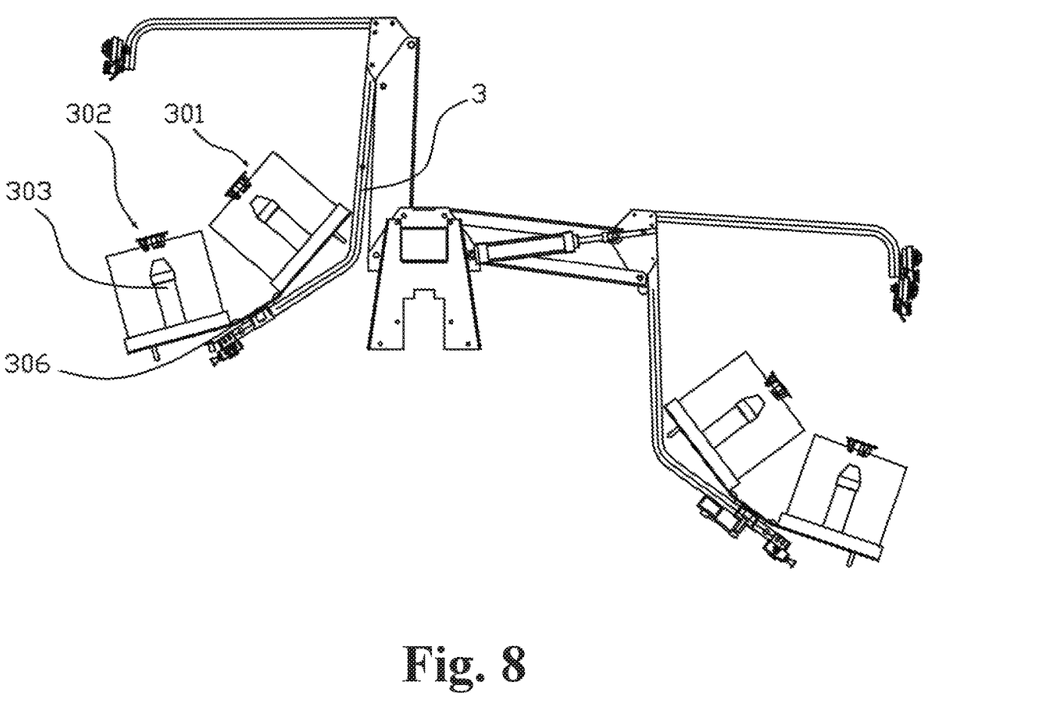
FIG. 8 is a structure diagram of a creel according to the present invention.
Figure 9:
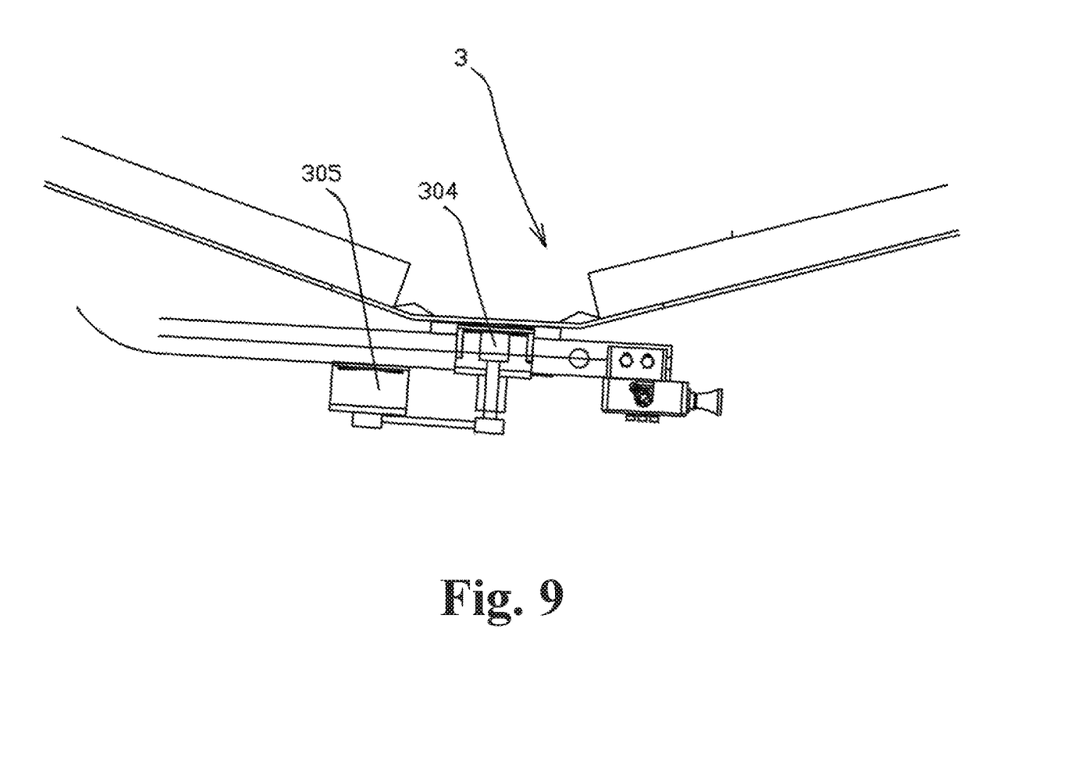
FIG. 9 is a partial structure diagram of the creel according to the present invention.

A preferred solution is shown in FIG. 1, FIG. 8 and FIG. 9, the twisting machine 2 is provided with the rotatable creel 3, an inside yarn position 301 and an outside yarn position 302 are respectively located at two ends of a yarn position seat 306, and the yarn position seat 306 is connected with the creel 3 through a rotating shaft 304 and is used for rotating the processed basic yarn 1 from the inside yarn position 301 to the outside yarn position 302. The yarn loading problem of the inside yarn position 301 in the prior art is solved by this structure.

The rotating shaft 304 is connected with a yarn position driving device 305 to drive the yarn position seat 306 to rotate. Rotation of the creel 3 may be adjusted manually or the creel may rotate automatically. As shown in FIG. 8, the yarn position driving device 305 comprises a servo motor, a DC motor or a hall motor. The motor is connected with the rotating shaft 304 through a speed reducer to drive the yarn position seat 306 to rotate, so as to switch positions of the inside yarn position 301 and the outside yarn position 302.

Figure 5:
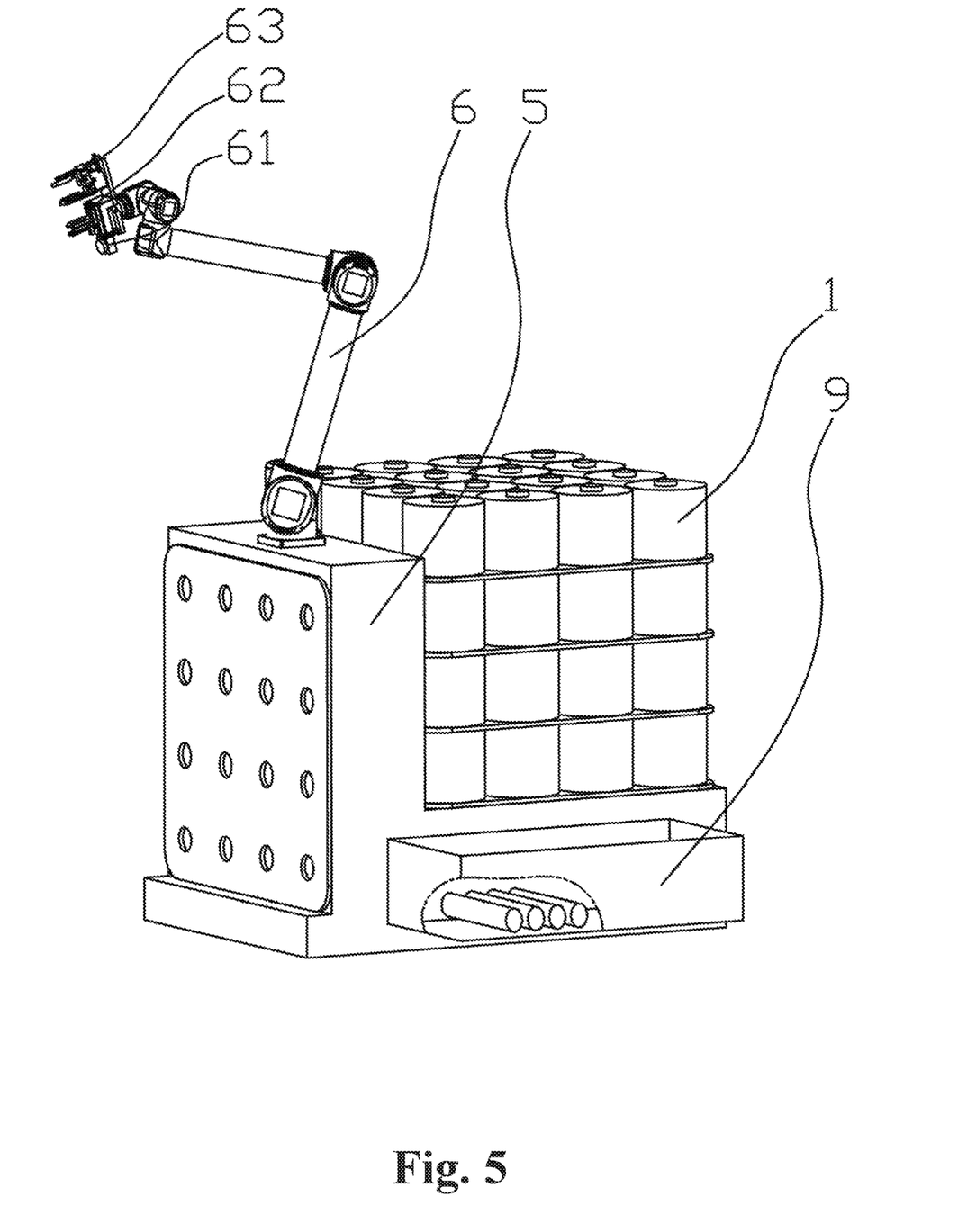
FIG. 5 is a stereoscopic diagram of the self-waling trolley according to the present invention.
Figure 7:
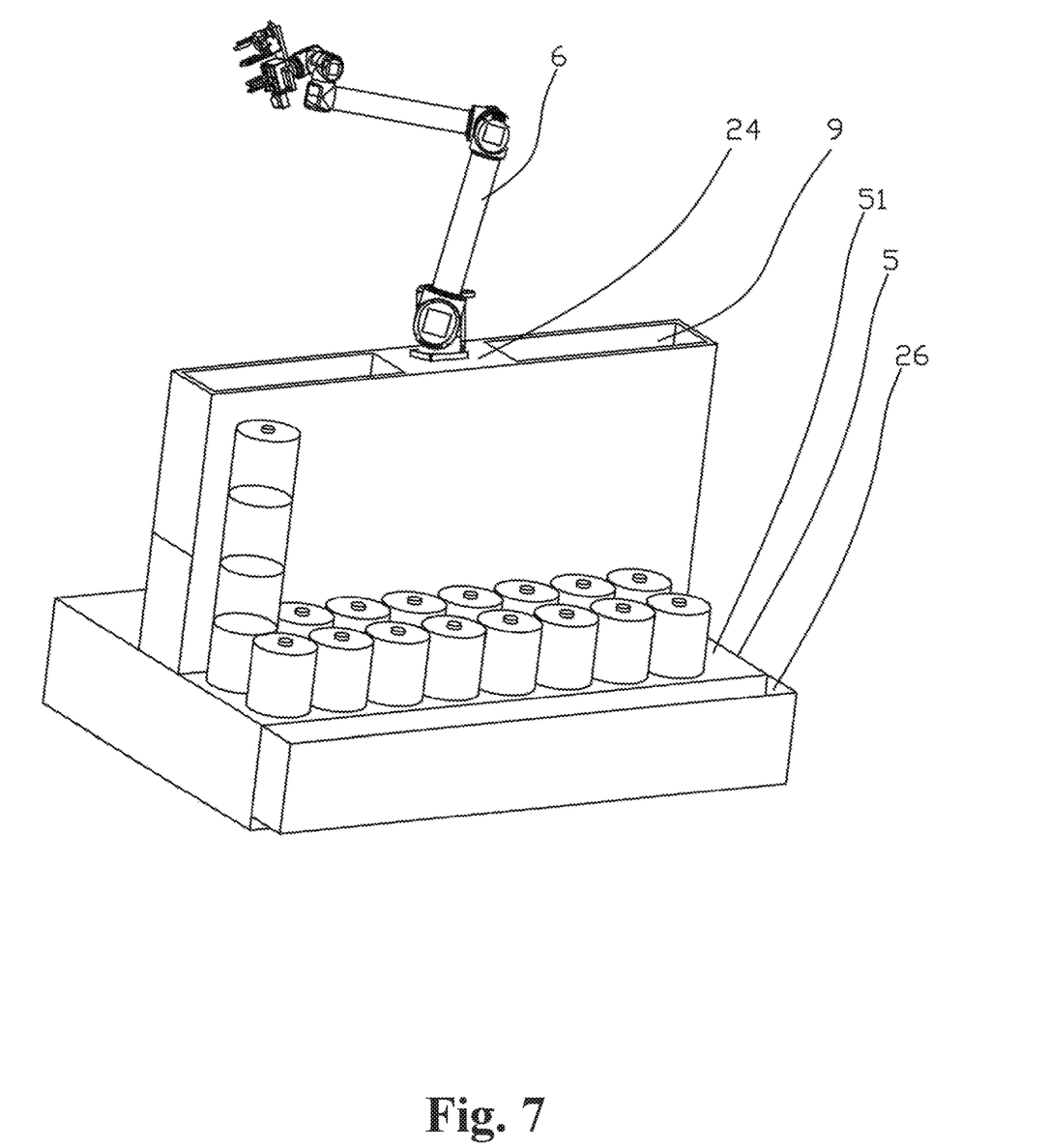
FIG. 7 is a stereoscopic diagram of a self-waling trolley of another preferred structure according to the present invention.

A preferred solution is shown in FIG. 2, FIG. 5 and FIG. 7, a roof of the self-walking trolley 5 is further provided with a manipulator 6, the manipulator 6 is a 3-axis to 6-axis manipulator, and a free end of the manipulator 6 is provided with a mechanical claw camera 61. Further preferably, the manipulator 6 is further provided with a first mechanical claw 62 and a second mechanical claw 63.

The mechanical claw camera 61 is used for judging a position of the mechanical claw through visual recognition by acquiring an image. Monocular visual recognition is the prior art, for example, the Chinese patent document CN111028267A records a monocular vision following system and monocular vision following method for a mobile robot, the CN111209802A records a scene analysis method for a robot vision image based on graphic focus shift, etc. The record herein is only used to prove that this technology belongs to the prior art, and does not represent that the visual recognition solution described in this document is used in the embodiment.

The first mechanical claw 62 is used for taking off the bobbin 4, and the second mechanical claw 63 is used for installing the basic yarn 1. The first mechanical claw 62 and the second mechanical claw 63 are a plurality of mechanical fingers capable of changing a circumscribed circle diameter. Operations of taking the empty bobbin 4 and loading the basic yarn 1 may be completed simultaneously through one telescopic action of the manipulator by this structure.

In a preferred solution, the self-walking trolley 5 is further provided with a basic yarn stacking position 51, an empty bobbin storage box 9 and a partition board storage box 26. The basic yarn stacking position 51 is used for storing a plurality of basic yarns 1. The partition board storage box 26 is used for storing the partition board 8 between each layer of stacked basic yarns 1, and the partition board 8 is provided with a plurality of holes for positioning the bobbin 4. The partition board 8 is made of foam. Further preferably, the partition board 8 is provided with a recognition code, which is used to assist a controller on the self-walking trolley 5 to quickly recognize the partition board 8 according to an image of the mechanical claw camera 61, and no basic yarn 1 exists on the partition board 8.

Figure 6:
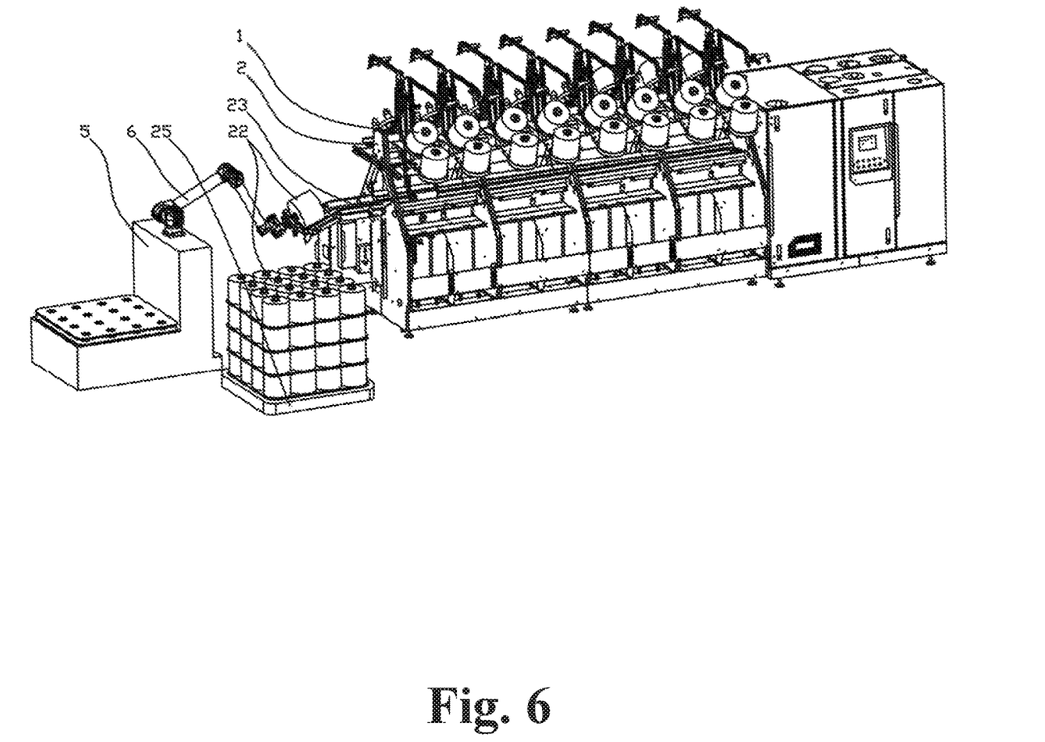
FIG. 6 is a stereoscopic diagram that the self-waling trolley unloads a finished product package from the twisting machine according to the present invention.

Optionally, as shown in FIG. 2, FIG. 5 and FIG. 6, the self-walking device is arranged on a bottom portion of the self-walking trolley 5, and a raised frame is arranged on one side of a top portion of the self-walking trolley 5. A 5-axis to 6-axis manipulator 6 is fixedly arranged on a top portion of the frame, the basic yarn stacking position 51 is arranged on one side of the frame, and a partition board storage position is arranged on the other side of the frame. The empty bobbin storage boxes 9 are arranged on two sides of the self-walking trolley 5.

Another optional solution is shown in FIG. 7, the empty bobbin storage box 9 is located in a middle of the self-walking trolley 5, a top portion of the empty bobbin storage box 9 is provided with a manipulator seat 24, and the manipulator 6 is fixedly installed on the manipulator seat 24.

The basic yarn stacking positions 51 are located on two sides of the empty bobbin storage box 9, and the partition board storage boxes 26 are located on two sides of the basic yarn stacking position 51.

A preferred solution is shown in FIG. 2, the dispatching control system 12 comprises task implementation, device management and production management modules.

The task implementation module is responsible for receiving a signal and sending an instruction, monitoring task implementation, making correction and feedback in real time, and dispatching tasks simultaneously implemented by multiple self-walking trolleys 5; and docking the tasks with front-end material feeding and back-end storage to ensure smooth operation and supply of materials.

The device management module manages charging, an operating state, a device state, fault alarm, safety recognition and a human-vehicle diversion state of the self-walking trolley 5.

The production management module manages a current shift and a shift output, a total output, an operating beat and an efficiency, and monitors a consumption state of the basic yarn 1 of the machine.

A preferred solution shown in FIG. 1, the twisting machine 2 is provided with a basic yarn sensor 7, a photoelectric sensor is preferably used as the basic yarn sensor 7, and the basic yarn sensor 7 is located at a position closely tangent to an outer diameter of the bobbin 4 to detect consumption of the basic yarn 1. When the basic yarn 1 is completely consumed, a signal is sent, which is received and analyzed by the dispatching control system 12, and then a yarn change request is sent to an operator and the self-walking trolley 5. The basic yarn sensor 7 is used as a basis for starting a yarn loading task by this structure.

Embodiment 2

A control method used in the above intelligent yarn loading system comprises the following steps.

In S1, consumption information of the basic yarn 1 is sent by the twisting machine 2 according to a detection signal of the basic yarn sensor 7.

Meanwhile, the bobbin 4 on which the basic yarn is used up on the creel 3 is switched to the outside yarn position 302. Preferably, automatic switching is performed by the yarn position driving device 305.

In S2, information sent by the twisting machine 2 is received by the dispatching control system 12, and the self-walking trolley 5 after finishing preparation is instructed to automatically walk to vicinity of the twisting machine 2. In an instruction of the dispatching control system 12, an operating track of the self-walking trolley 5 is planned, and the operating track needs to avoid interference with other self-walking trolleys 5. In the operating track, when a certain stroke is accumulated, the self-waling trolley 5 needs to be instructed to pass through the navigation device, and an accumulated error of operation of the self-walking trolley 5 is eliminated according to the navigation device. Further preferably, the planned operating track should also seek to maximize benefits, which means that most yarn loading operations are able to be completed in a shortest stroke. Preferably, an insertion operation is used in planning of the operating track, the dispatching control system 12 sets the operating track as a vector path with a plurality of nodes, and each node corresponds to the station of the yarn loading operation. When operation of one node is completed, the node is deleted in the vector path. When a new yarn change request occurs, the dispatching control system 12 judges whether the new node coincides with the current vector path, if yes, the node is inserted into the current vector path, and if not, the node is discharged into a next operating track, an idle self-walking trolley 5 is waited, and then a new operating track is given to the idle self-walking trolley 5.

The manipulator 6 takes off the basic yarn 1 from a yarn stack 11, and the manipulator 6 takes off the bobbin 4 and installs the basic yarn 1 in situ.

A position of the basic yarn 1 on the yarn stack 11 is positioned through visual recognition by an image shot by the mechanical claw camera 61 during operating, and a position of a positioning rod 303 needing yarn loading on the creel 3 is positioned through visual recognition by the image shot by the mechanical claw camera 61, thus assisting in adjusting a relative position between the mechanical claw and the positioning rod 303. Specific steps are as follows: the mechanical claw camera 61 shoots a top view of the basic yarn stacking position 51 first, the position of the basic yarn 1 is judged, the second mechanical claw 63 is inserted into the bobbin 4 of the basic yarn 1, the mechanical fingers are opened to fix the bobbin 4, and the basic yarn 1 is lifted. The manipulator 6 is operated above the outside yarn position 302 of the creel 3 on the current station, the mechanical claw camera 61 shoots an image of the outside yarn position 302, and finds a position of the positioning rod 303 to align the first mechanical claw 62 with the positioning rod 303. The first mechanical claw 62 is extended into the empty bobbin 4 to expand the bobbin 4, and then takes off the empty bobbin 4. The second mechanical claw 63 is moved to be aligned with the positioning rod 303, and the basic yarn 1 grabbed by the second mechanical claw 63 is released, and loaded on the positioning rod 303. When the basic yarn 1 of the inside yarn position 301 is used up, the positions of the inside yarn position 301 and the outside yarn position 302 are switched again. The manipulator 6 which completes installation of the basic yarn 1 puts the bobbin 4 into the empty bobbin storage box 9, and a number is counted to prevent the empty bobbin storage box 9 from overflowing. The self-walking trolley 5 moves to a next node again for yarn loading.

Intelligent yarn loading is realized by the above steps.

A preferred solution is shown in FIG. 6, the dispatching control system 12 counts a number according to the consumption information of the basic yarn 1 sent by the twisting machine 2, and a certain amount is accumulated, which means that the self-walking trolley 5 is instructed to unload the finished product package 22 at a tail of the twisting machine 2, and the finished product package is stacked on a nearby pallet 25. The number is counted, and when the stacking is completed, the dispatching control system 12 informs an operator to move the full pallet 25 and arrange a new pallet 25.

The dispatching control system 12 instructs the self-walking trolley 5 to charge the self-walking trolley at a charging position 21 according to an electric quantity of the self-walking trolley 5.

The self-walking trolley 5 counts yarn loading times every time, and when the counted times reach the number of the basic yarns of the basic yarn stacking position 51, in other words, when the basic yarns of the basic yarn stacking position 1 are used up, the self-walking trolley 5 automatically goes to a yarn taking area 20 to supplement the basic yarn 1, and unloads the bobbin 4 and the partition board 8.

The above embodiments are only preferred technical solutions of the present invention, and should not be regarded as limiting the present invention. The scope of protection of the present invention should be a scope of protection including the equivalent alternatives of the technical features in the technical solutions recorded in the claims according to the technical solutions recorded in the claims. The equivalent substitutions and improvements in the scope are also included in the scope of protection of the present invention.

What is claimed is:

1. An intelligent yarn loading system, comprising a twisting machine (2), a self-walking trolley (5) and a dispatching control system (12), wherein,
    the twisting machine (2) is provided with a twisting machine wireless communication module (17) for sending a working state of the twisting machine (2) to the dispatching control system (12);
    the self-walking trolley (5) is provided with a trolley wireless controller (10) and a self-walking device (52) for receiving an instruction of the dispatching control system (12) and walking to a station of the twisting machine (2) to take off an empty bobbin (4), and putting a basic yarn (1) on a creel (3) of the twisting machine (2) or taking off a finished product package (22) for stacking, and the self-walking device is able to automatically walk to a designated position according to feedback of a navigation device; and
    the dispatching control system (12) is used for receiving the working state of the twisting machine (2), and dispatching the self-walking trolley (5) to load or unload a yarn for the twisting machine (2) according to the working state of the twisting machine (2);
    the dispatching control system (12) is electrically connected with a switch (14) through a wireless communication module (13), the switch (14) is electrically connected with a wireless communication module (15), the wireless communication module (15) is connected with the self-walking trolley (5) or the twisting machine (2) directly or through a wireless relay (16) to form a communication network among the twisting machine (2), the self-walking trolley (5) and the dispatching control system (12);
    the navigation device is used for enabling the self-walking trolley (5) to accurately judge a position of the self-walking trolley (5), and eliminating an error of the self-walking device;
    the navigation device is a backup plate (27), and the self-walking trolley (5) approaches the backup plate (27) from two sides, so as to eliminate an accumulated error of the self-walking device (52);
    the twisting machine (2) is provided with the rotatable creel (3), an inside yarn position (301) and an outside yarn position (302) are respectively located at two ends of a yarn position seat (306), and the yarn position seat (306) is connected with the creel (3) through a rotating shaft (304) and is used for rotating the basic yarn (1) from the inside yarn position (301) to the outside yarn position (302); and
    the rotating shaft (304) is connected with a yarn position driving device (305) to drive the yarn position seat (306) to rotate;
    a roof of the self-walking trolley (5) is further provided with a manipulator (6), and a free end of the manipulator (6) is provided with a mechanical claw camera (61), a first mechanical claw (62) and a second mechanical claw (63);
    the mechanical claw camera (61) is used for judging a position of one of the first mechanical claw (62) and the second mechanical claw (63) through visual recognition by acquiring an image; and the first mechanical claw (62) is used for taking off the bobbin (4), and the second mechanical claw (63) is used for installing the basic yarn (1); and the first mechanical claw (62) and the second mechanical claw (63) are a plurality of mechanical fingers capable of changing a circumscribed circle diameter;

the self-walking trolley (5) is further provided with a basic yarn stacking position (51), an empty bobbin storage box (9) and a partition board storage box (26);

the empty bobbin storage box (9) is located in a middle of the self-walking trolley (5), a top portion of the empty bobbin storage box (9) is provided with a manipulator seat (24), and the manipulator (6) is fixedly installed on the manipulator seat (24) and is located in the middle of the self-walking trolley (5); and the basic yarn stacking position (51) is located on two sides of the empty bobbin storage box (9), and the partition board storage box (26) is located on two sides of the basic yarn stacking position (51);

the twisting machine (2) is provided with a basic yarn sensor (7), the basic yarn sensor (7) is located at a position closely tangent to an outer diameter of the bobbin (4) to detect consumption of the basic yarn (1), when the basic yarn (1) is completely consumed, a signal is sent, which is received and analyzed by the dispatching control system (12), and then a yarn change request is sent to an operator and the self-walking trolley (5).

2. The intelligent yarn loading system according to claim 1, wherein, the dispatching control system (12) comprises a task implementation module, a device management module and a production management module;

the task implementation module is responsible for receiving a signal and sending an instruction, monitoring task implementation, making correction and feedback in real time, and dispatching tasks simultaneously implemented by multiple self-walking trolleys (5); and docking the tasks with front-end material feeding and back-end storage to ensure smooth operation and supply of materials;

the device, management module manages charging, an operating state, a device state, fault alarm, safety recognition and a human-vehicle diversion state of the self-walking trolley (5); and the production management module manages a current shift and a shift output, a total output, an operating beat and an efficiency, and monitors a consumption state of the basic yarn (1) of the machine.

3. A control method used in the intelligent yarn loading system according to claim 1, comprising the following steps:

sending, by the twisting machine (2), consumption information of the basic yarn (1) according to a detection signal of the basic yarn sensor (7); and receiving, by the dispatching control system (12), information sent by the twisting machine (2), instructing the self-walking trolley (5) after finishing preparation to automatically walk to vicinity of the twisting machine (2), taking off, by the manipulator (6), the basic yarn (1) from a yarn stack (11), and taking off, by the manipulator (6), the bobbin (4) and installing the basic yarn (1) onto the creel (3); and positioning a position of the basic yarn (1) on the yarn stack (11) through visual recognition by an image shot by the mechanical claw camera (61) during operating; and positioning a position of a positioning rod (303) needing yarn loading on the creel (3) through visual recognition by the image shot by the mechanical claw camera (61).

4. The control method of the intelligent yarn loading, system according to claim 3, wherein, the dispatching control system (12) counts a number according to the consumption information of the basic yarn (1) sent by the twisting machine (2), and a certain amount is accumulated, which means that the self-walking trolley (5) is instructed to unload the finished product package (22) at a tail of the twisting, machine (2), and the finished product package (22) is stacked on a nearby pallet (25);

the dispatching control system (12) instructs the self-walking trolley (5) to charge the self-walking trolley at a charging position (21) according to an electric quantity of the self-walking trolley (5); and the self-walking trolley (5) counts yarn loading times every time, and when counted times reach a number of the basic yarns of a basic yarn stacking position (51), the self-walking trolley (5) automatically goes to a yarn taking area (20) to supplement the basic yarn (1), and unloads the bobbin (4) and a partition board (8).

* * * * *